(12) United States Patent
Maejima

(10) Patent No.: US 8,996,924 B2
(45) Date of Patent: Mar. 31, 2015

(54) MONITORING DEVICE, MONITORING SYSTEM AND MONITORING METHOD

(75) Inventor: Mitsuru Maejima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 100 days.

(21) Appl. No.: 13/333,246

(22) Filed: Dec. 21, 2011

(65) Prior Publication Data

US 2012/0221885 A1 Aug. 30, 2012

(30) Foreign Application Priority Data

Feb. 24, 2011 (JP) .................................. 2011-038939

(51) Int. Cl.
*G06F 11/00* (2006.01)
*H04L 12/24* (2006.01)

(52) U.S. Cl.
CPC ............ *H04L 41/064* (2013.01); *H04L 41/069* (2013.01)
USPC ............................... 714/48; 714/25; 714/47.1

(58) Field of Classification Search
CPC ................................................... G06F 11/3495
USPC ............................ 714/48, 25, 4.1, 37, 2, 47.1
See application file for complete search history.

(56) References Cited

U.S. PATENT DOCUMENTS

| 2003/0131291 A1* | 7/2003 | Morrison et al. ................ 714/54 |
| 2005/0235058 A1* | 10/2005 | Rackus et al. ................. 709/224 |
| 2006/0075292 A1 | 4/2006 | Fukui |
| 2010/0070795 A1* | 3/2010 | Shimada et al. ................... 714/2 |
| 2010/0180016 A1* | 7/2010 | Bugwadia et al. ............. 709/220 |
| 2010/0275061 A1* | 10/2010 | Lee ................................. 714/27 |
| 2011/0264956 A1 | 10/2011 | Ito et al. |
| 2012/0144251 A1* | 6/2012 | Carey et al. ..................... 714/57 |

FOREIGN PATENT DOCUMENTS

| EP | 1 187 024 A2 | 3/2002 |
| JP | 10-149323 | 6/1998 |
| JP | 2001-034509 | 2/2001 |
| JP | 2002-055850 | 2/2002 |
| JP | 2002-82816 | 3/2002 |
| JP | 2005-234861 | 9/2005 |
| JP | 2006-92192 | 4/2006 |
| JP | 2006-107080 | 4/2006 |
| WO | 2011/007394 A1 | 1/2011 |

OTHER PUBLICATIONS

Japanese Office Action issued May 27, 2014 in corresponding Japanese Patent Application No. 2011-038939.

* cited by examiner

*Primary Examiner* — Sarai Butler
(74) *Attorney, Agent, or Firm* — Staas & Halsey LLP

(57) ABSTRACT

A monitoring device including: a receiving unit configured to receive a malfunction notice of a data processing device, the data processing device being connected to the monitoring device which monitors running condition through a network; a malfunction device identification unit configured to identify a data processing device that is malfunctioning based on the received malfunction notice; a data obtaining unit configured to obtain running data and device data of the data processing device that is malfunctioning and an another data processing device; and a malfunction cause identification unit configured to identify a cause of the malfunction, based on the obtained running data and the obtained device data.

1 Claim, 10 Drawing Sheets

FIG. 3

| DATA OF ANALYSIS | MALFUNCTION REPORTER | MALFUNCTIONING DEVICE | DETAILED MALFUNCTION | RE SWITCH | RE STORAGE | RE CASCADE CONNECTION |
|---|---|---|---|---|---|---|
| 12/28/2010 11:25:05 | SWITCH 100 | STORAGE DEVICE 50 | READ ERROR | FOS (FOS-A) | SOFTWARE (SW-1) | SWITCH 100 (FOS = FOS-A2) |
| ... | ... | ... | ... | ... | ... | ... |

FIG. 4

| DETAILED MALFUNCTION | MALFUNCTION CIRCUMSTANCES | CONNECTION CIRCUMSTANCES | DETAILED MEASURES |
|---|---|---|---|
| READ ERROR | FOS VERSION (FOS-A) | STORAGE DEVICE(SW-1) SWITCH(FOS-A2) | UPDATING FOS VERSION |
| ... | ... | ... | ... |

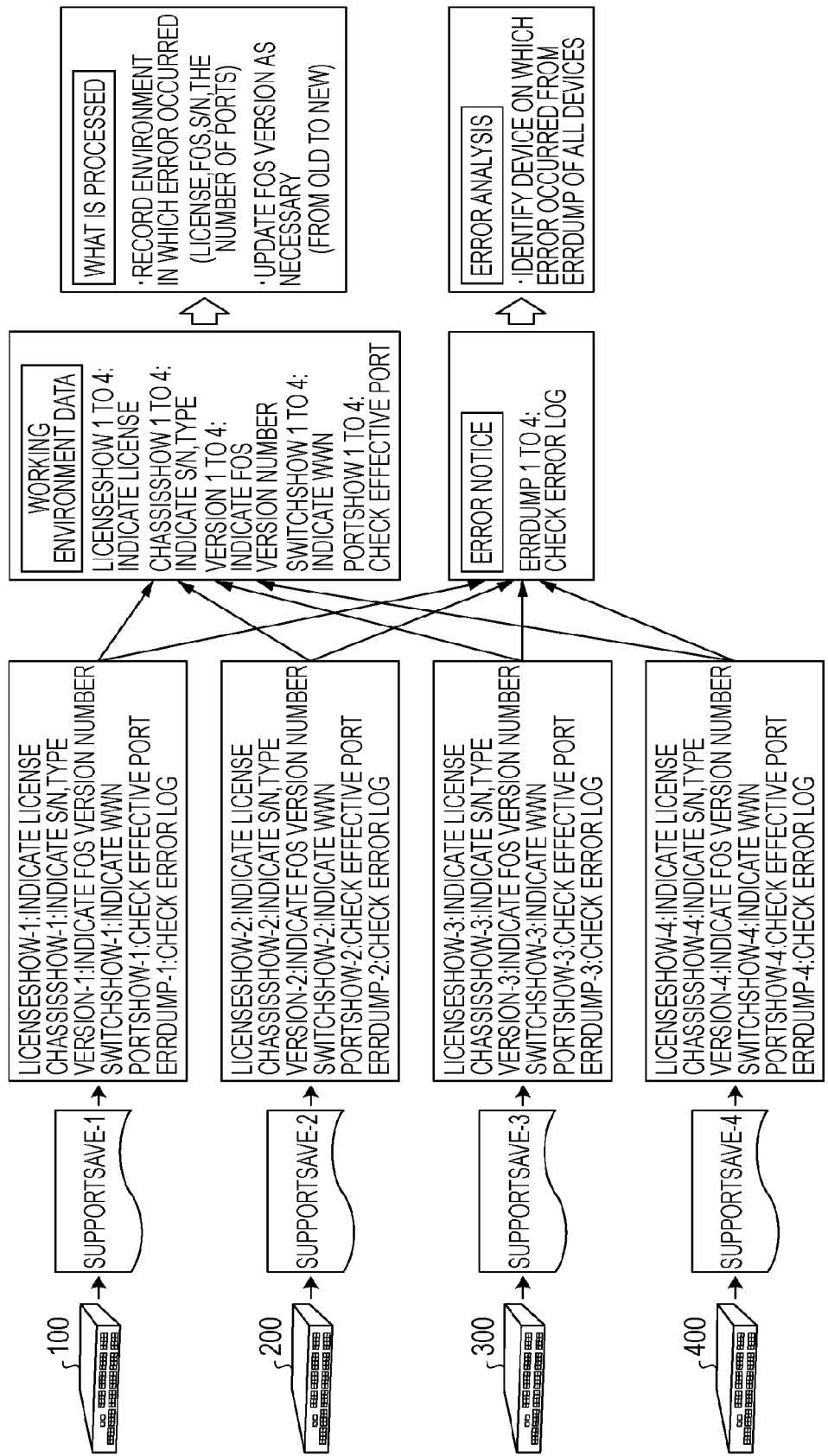

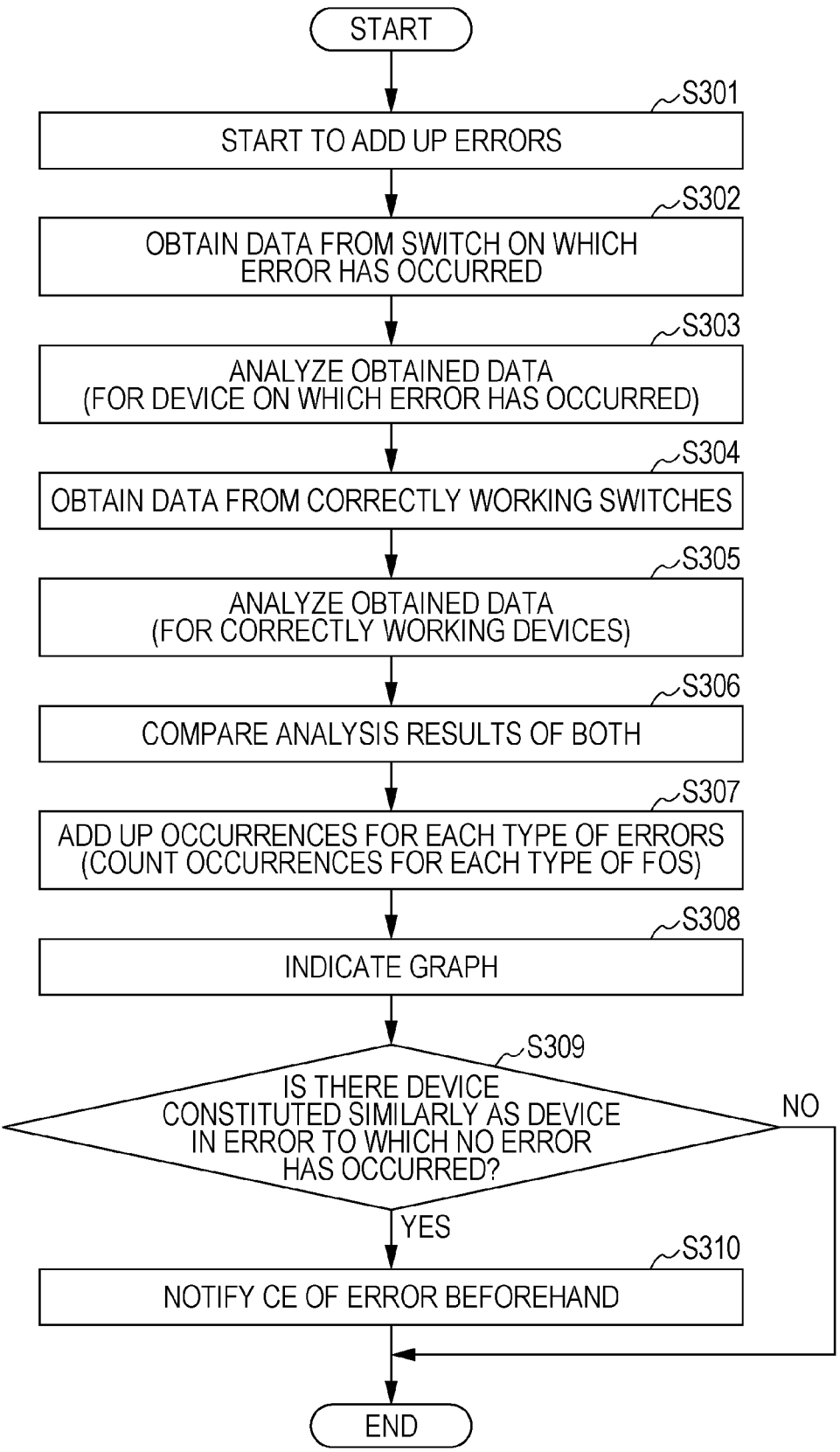

MONITORING DEVICE, MONITORING SYSTEM AND MONITORING METHOD

CROSS-REFERENCE TO RELATED APPLICATION

This application is based upon and claims the benefit of priority of the prior Japanese Patent Application No. 2011-38939, filed on Feb. 24, 2011, the entire contents of which are incorporated herein by reference.

FIELD

The present invention relates to a monitoring device, a monitoring system, and a monitoring method.

BACKGROUND

A data processing system comes to handle an increasing amount of data, and a storage system in which data is stored comes to have an increasing capacity in recent years. A data center is equipped with servers which run various processes by the use of data, storage systems in which data is stored and so forth. Fiber channel switches of high data rates are widely used as devices which connect the storage systems with the servers.

The number of fiber channel switches to be used increases as the number of servers, etc. installed in a data center increase. Further, a cascade connection method for connecting a plurality of fiber channel switches is used as well.

If something wrong with a device or a failure occurs on a fiber channel switch in such connection circumstances where lots of devices are connected with one another, a server detects an error in the fiber channel switch and notifies a CE (Customer Engineer) of the detected error. The CE collects a log of the fiber channel switch on which the error occurred, and analyzes the error. Then, the CE identifies spare parts to be exchanged and exchanges the parts. Maintenance work is practiced for the fiber channel switch which connects lots of devices in this way.

Further, a maintenance device, a remote monitoring device and so forth which practice maintenance work except for the maintenance work described above are used as well. Upon a failure occurring, e.g., the maintenance device identifies a similar failure and a recovery procedure from data of failures and recovery procedures in the past, and recovers the failed device from the failure in accordance with the identified recovery procedure. Further, the remote monitoring device receives monitoring data of the switch, identifies maintenance data on the basis of the received monitoring data, notifies an administrator of the identified maintenance data by email and displays the identified maintenance data on a Web screen at a website, etc.

Ordinary technologies have a problem, however, in that it takes time to identify a detailed cause of a malfunction having occurred on a device connected to lots of devices as described above, and that the device may not be recovered quickly from the malfunction.

In order, e.g., to identify a detailed cause of a malfunction having occurred on a device to be monitored according to the ordinary technologies, logs are collected from other devices. If lots of devices form the system, it takes long time to collect the logs. Further, as the collected logs are enormous and take long time to be analyzed, it takes lots of time to finally identify the cause of the malfunction. As a result, it takes lots of time to recover from the malfunction. Further, as it takes lots of time to recover from the malfunction, another malfunction may occur more possibly and damage caused by the malfunction may possibly expand.

Japanese Laid-open Patent Publications Nos. 2001-34509, 2002-55850 and 2006-107080 are examples of the related art.

SUMMARY

According to an embodiment, a monitoring device including: a receiving unit configured to receive a malfunction notice of a data processing device, the data processing device being connected to the monitoring device which monitors running condition through a network; a malfunction device identification unit configured to identify a data processing device that is malfunctioning based on the received malfunction notice; a data obtaining unit configured to obtain running data and device data of the data processing device that is malfunctioning and an another data processing device; and a malfunction cause identification unit configured to identify a cause of the malfunction, based on the obtained running data and the obtained device data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 illustrates exemplary data stored in an analysis data DB;

FIG. 4 illustrates exemplary data stored in a precedent DB;

FIG. 5 illustrates a process for identifying a malfunction;

FIG. 11 is a flowchart illustrating a process for searching for a switch working in similar condition in time of an error occurrence.

DESCRIPTION OF EMBODIMENTS

Embodiments of a monitoring device, a monitoring system and a monitoring method disclosed by the application will be explained in detail with reference to the drawings. Incidentally, the present invention is not limited to the embodiments.

First Embodiment

A constitution of an entire system of a first embodiment to be disclosed including a monitoring server will be explained, and so will constitutions of respective devices forming the system, a processing flow and an effect of the first embodiment. Incidentally, the system constitution, etc. disclosed here are exemplary only, and the invention is not limited to those.

Entire Constitution

Figure 1:
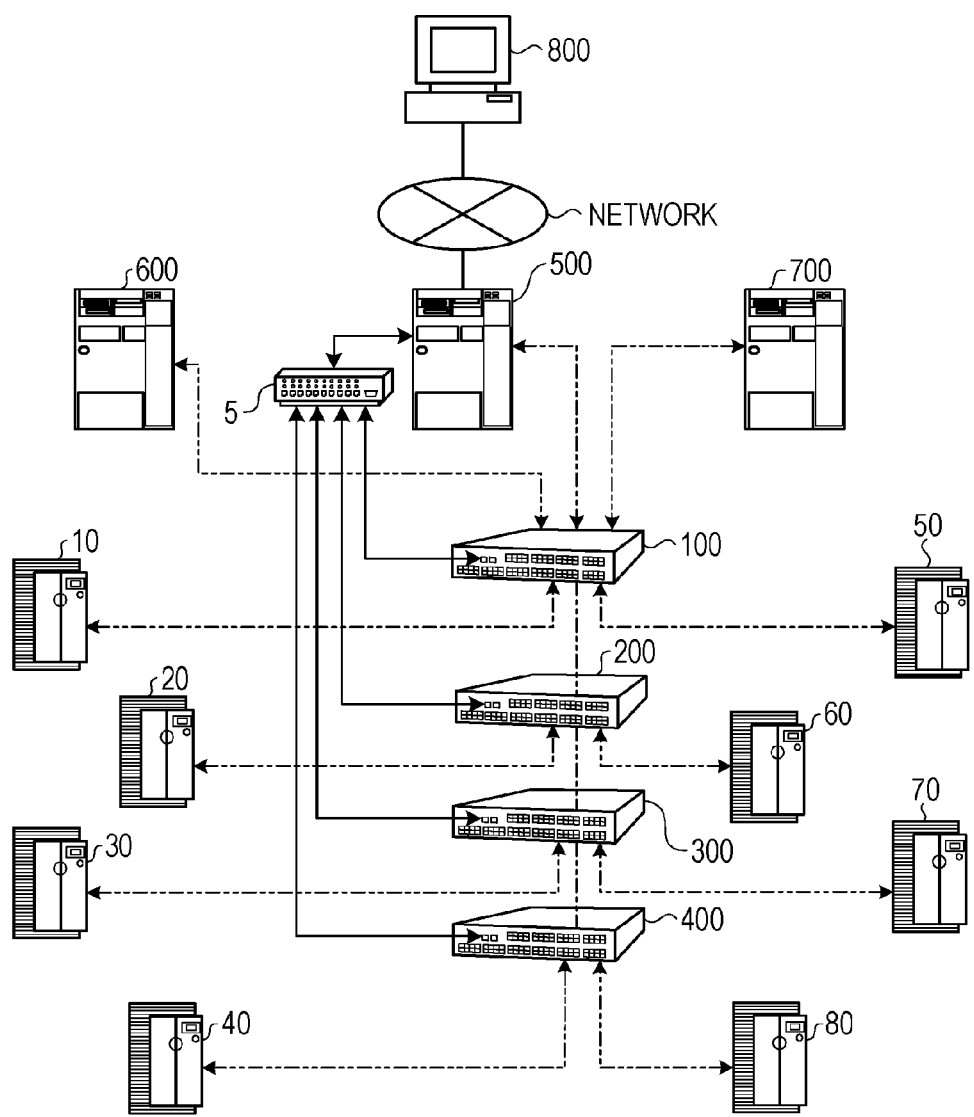
FIG. 1 illustrates an entire system constitution of a first embodiment.

FIG. 1 illustrates an entire constitution of the system of the first embodiment. The system has a switching hub 5, a monitoring server 500, a server 600, a server 700, switches 100-400, storage devices 10-80 and a quality assurance server 800 as illustrated in FIG. 1. The respective servers, switches and storage devices are connected to one another in the system by a business use network using an FC (Fiber Channel) to be used for business. Further, the monitoring server 500 and the respective switches are connected to one another by a maintenance use network which is different from the business use network.

The monitoring server 500 is a maintenance server which monitors a malfunction occurring on each of the respective switches or storage devices, and is connected to the respective switches by a LAN (Local Area Network) via the switching hub 5. That is, the monitoring server 500 is connected to each of the switches 100, 200, 300 and 400 by a maintenance use network.

Further, the monitoring server 500 is connected to the switch 100 through an FC, and to the respective switches and storage devices via the switch 100. Further, the monitoring server 500 is connected to the quality assurance server 800 via a network such as the Internet.

The servers 600 and 700 are each connected to the switch 100 though an FC, and to the respective switches and storage devices via the switch 100. The servers 600 and 700 are business use servers. The servers 600 and 700 each store data in the respective storage devices and read necessary data from the respective storage devices so as to run various processes.

The switches 100-400 are each a network device such as an FC switch which relays data communication between the storage device and each of the servers. The switch 100 is connected to each of the maintenance server 500, the servers 600 and 700, the storage devices 10 and 50 and the switch 200 by the FC, and to the switching hub 5 by the LAN. The switch 200 is connected to each of the switch 100, the storage devices 20 and 60 and the switch 300 by the FC, and to the switching hub 5 by the LAN.

The switch 300 is similarly connected to each of the switch 200, the storage devices 30 and 70 and the switch 400 by the FC, and to the switching hub 5 by the LAN. The switch 400 is connected to each of the switch 300 and the storage devices 40 and 80 by the FC, and to the switching hub 5 by the LAN. That is, the switches 100-400 are in cascade connection.

The storage devices 10-80 are each a storage unit in which data to be used for the respective processes by the servers 600 and 700 is stored. The storage devices are each connected to one of the switches. Further, monitoring software is installed in each of the storage devices. The monitoring software is active all the time in each of the storage devices, and detects a malfunction which occurs on the storage such as a read/write error, a detected network disconnection and a hardware failure.

The quality assurance server 800 is a server which manages data such as software or firmware programs which run on the respective storage devices or switches. The quality assurance server 800 obtains latest versions or patches individually from software vendors' websites and so forth, and stores the obtained programs. The quality assurance server 800 stores therein, e.g., a latest version (version number) of an FOS (Fabric Operating System) which runs on each of the switches or of maintenance software which runs on each of the storage devices.

The monitoring server 500 is a monitoring device which monitors working condition of the respective storages and switches in such circumstances, and receives a malfunction notice from the respective storage devices and switches. Then, the monitoring server 500 identifies a malfunctioning device on the basis of the received malfunction notice. Then, the monitoring server 500 obtains working data and device data of the malfunctioning device and of other devices being free from a malfunction. Then, the monitoring server 500 identifies a cause of the malfunction on the basis of the obtained working and device data.

The monitoring server 500 automatically obtains constitution data and an error notice from each of the respective devices in this way. A CE (Customer Engineer) may thereby quickly grasp what kind of malfunction occurs where even in the entire complicated system formed by the switches included in the cascade connection, and may search for the cause in a short period of time. As a result, the CE may identify a detailed cause of the malfunction early enough, and may recover the system from the malfunction early enough.

Constitutions of Respective Devices

Then, constitutions of the monitoring server 500 and the respective switches and storages illustrated in FIG. 1 will be explained by the use of FIGS. 2-7. Incidentally, as the switching hub 5 is similarly constituted as an ordinary switching hub and the servers 600 and 700 are each similarly constituted as an ordinary built-in type or blade-type server, their detailed explanations are omitted. Further, as the quality assurance server 800 is similarly constituted as an ordinary server except for a function for periodically obtaining latest versions or patches from respective vendors' websites and so forth, its detailed explanation is omitted.

Constitution of Monitoring Server

Figure 2:
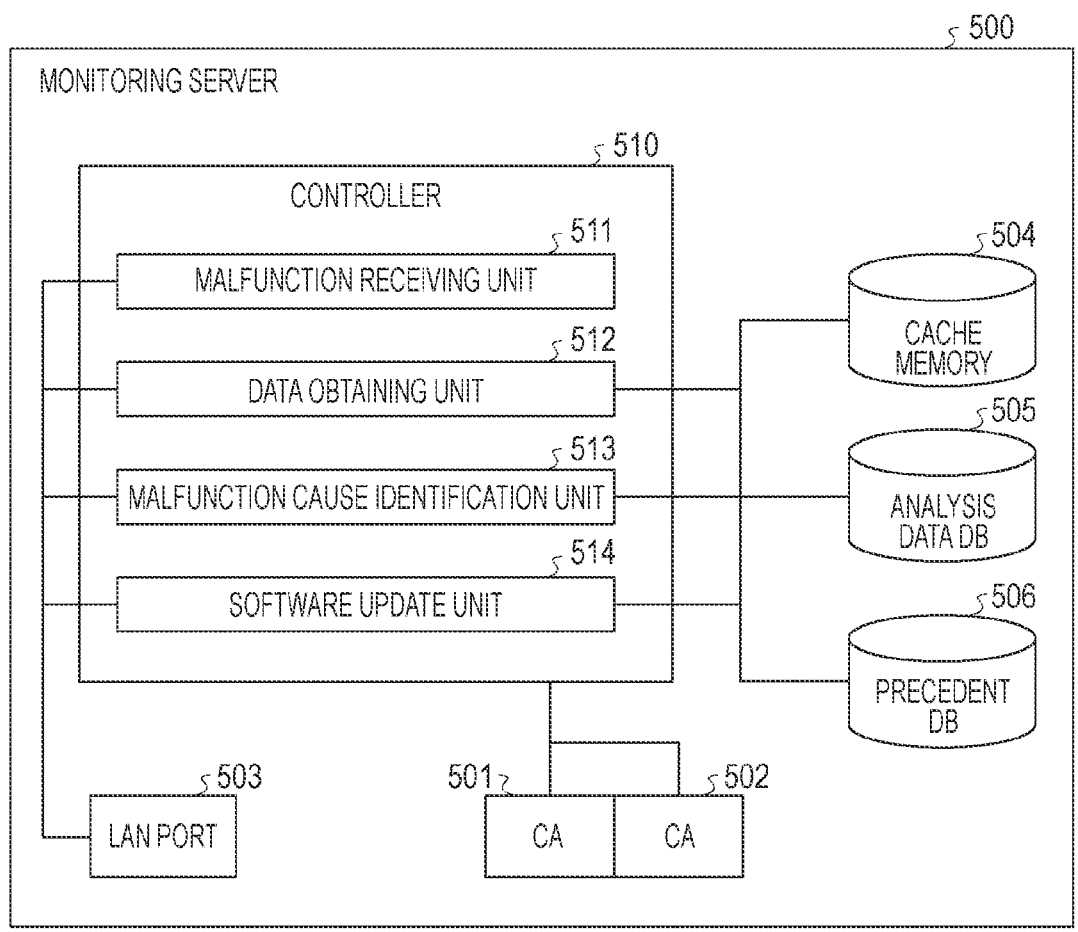
FIG. 2 is a block diagram illustrating a constitution of a monitoring server.

FIG. 2 is a block diagram for illustrating a constitution of the monitoring server. The monitoring server 500 has a CA (Channel Adapter) 501, a CA 502, a LAN port 503, a cache memory 504, an analysis data DB (Data Base) 505, a precedent DB 506 and a controller 510 as illustrated in FIG. 2. Incidentally, the cache memory 504, the analysis data DB 505 and the precedent DB 506 are each a memory device such as a semiconductor memory element or a hard disk.

The CA 501 and the CA 502 are redundantly configured adapters for host connection which are connected to the business use network. The CA 501 or the CA 502 connects the monitoring server 500 with the switch 100 through the FC. The CA 501, e.g., transmits a request for writing or receiving data to or from the respective switches or storages, or receives a result of each of the requests, and so does the CA 502.

The LAN port 503 is an interface connected with the maintenance use network, and is connected to the switching hub 5. The LAN port 503 is connected, e.g., with a network using Ethernet (registered trademark). The LAN port 503 receives an error notice transmitted by the switch 100, or transmits instructions to update software addressed to the respective switches or storages.

The cache memory 504 is a temporary area that respective controllers included in the controller 510 each use in order to run a process. The cache memory 504 stores therein, e.g., a malfunction report (malfunction notice) received by a malfunction receiving unit 511, data concerning the respective storage devices or switches obtained by a data obtaining unit 512 and so forth. Further, the cache memory 504 stores therein intermediate data handled by a malfunction cause identification unit 513 analyzing the malfunction, latest versions of various software that a software update unit 514 has obtained from the quality assurance server 800 and so forth.

The analysis data DB 505 stores therein an analysis result that the malfunction cause identification unit 513 has obtained through an analysis. Data stored here is filed, updated and deleted by the malfunction cause identification unit 513. FIG. 3 illustrates exemplary data stored in the analysis data DB. The analysis data DB 505 stores therein data items of an analysis result such as "date of analysis, malfunction reporter, malfunctioning device, detailed malfunction, re switch, re storage, re-cascade connection" related to one another as illustrated in FIG. 3. Incidentally, the data items indicated here are exemplary only. The data items are not limited to what is illustrated in FIG. 3, and can be changed as set by a user.

The data item "date of analysis" stored here indicates date and time when a malfunction is detected and analyzed. The data item "malfunction reporter" is data for identifying a switch having notified the monitoring server 500 of the malfunction. Data such as a name, an IP (Internet Protocol) address or a MAC (Media Access Control) address of the switch is filed as this data item. The data item "malfunctioning device" is data for identifying a device for which the malfunction notice indicates detection of the occurrence of the malfunction, and indicates a name, an IP address or a MAC address of a storage device or a switch. The data item "detailed malfunction" analytically and specifically indicates details of the malfunction. The data item "re switch" indicates data for identifying a version of software run on a switch connected with the malfunctioning device, and so forth. The data item "re storage" indicates data for identifying a version of software run on a storage device on which the malfunction has been detected or a storage device connected to a switch on which the malfunction has been detected, and so forth. The data item "re cascade connection" indicates data as to a switch connected to the switch which has reported the error in cascade connection.

As exemplarily illustrated in FIG. 3, the monitoring server 500 receives from the switch 100 a notice of a malfunction which occurred on the storage device 50 at 11:25:05 (hour:minute:second) on Dec. 28, 2010. FIG. 3 indicates what was identified according to an analysis of the malfunction notice such that a "read error" occurred on the "storage device 50", that the version of the software run on the storage device 50 is SW-1, and that an FOS version of the switch 100 is FOS-A. Further, FIG. 3 indicates that an FOS version of the switch 200 connected to the switch 100 in cascade connection is FOS-A2. Incidentally, suppose that the version FOS-A2 is more up-to-date than FOS-A.

The precedent DB 506 stores therein a precedent in which a detailed malfunction detected in the past is related to detailed maintenance action taken for the detailed malfunction. Data stored here is filed, updated and deleted by an administrator of the monitoring server 500. FIG. 4 illustrates exemplary data stored in the precedent DB. The precedent DB 506 stores therein a precedent in which data items "detailed malfunction, malfunction circumstances, connection circumstances, detailed measures" are related to one another as illustrated in FIG. 4.

The data item "detailed malfunction" stored here indicates details of a detected malfunction of a switch or a storage device. The data item "malfunction circumstances" indicates data related to software, etc. estimated to be a cause of the detailed malfunction, device data of a switch or a storage device on which the malfunction was detected and so forth. The data item "connection circumstances" indicates connection circumstances which were estimated to be a cause of the malfunction, e.g. the FOS versions of the respective switches or a version of software of each of the switches and the storage devices. The data item "detailed measures" is where detailed maintenance action taken for the detailed malfunction is filed.

As exemplarily illustrated in FIG. 4, a version of software run on a storage device on which a read error occurred was SW-1, and an FOS version of a switch connected to the storage device is FOS-A. Further, an FOS version of a switch connected to the switch in cascade connection is FOS-A2. FIG. 4 indicates that the FOS version (FOS-A) was updated in a process for recovery from the read error which occurred in the above condition.

The controller 510 is an electronic circuit having an internal memory such as a CPU (Central Processing Unit), and has the malfunction receiving unit 511, the data obtaining unit 512, the malfunction cause identification unit 513 and the software update unit 514.

The malfunction receiving unit 511 receives a notice of a malfunction of one of the respective switches and storage devices from the LAN port 503, and identifies a malfunctioning device on the basis of the received malfunction notice. Specifically, the malfunction receiving unit 511 receives a malfunction notice that one of the respective switches has transmitted to the maintenance use network, and files the malfunction notice in the cache memory 504. Then, the malfunction receiving unit 511 identifies a malfunctioning device from the malfunction notice filed in the cache memory 504. The malfunction receiving unit 511 files data of the identified device in the cache memory 504, and notifies the data obtaining unit 512 of the data of the identified device.

The malfunction receiving unit 511 receives, e.g., a malfunction report transmitted by means of monitoring software run on the respective switches. In this case, the malfunction receiving unit 511 can identify a malfunctioning device by obtaining a "host name", etc. indicated by "malfunction-detected device" specified by the monitoring software, etc.

Further, the malfunction receiving unit 511 can receive a malfunction report by means of an alarm or an unsynchronized report due to a trap of an SNMP (Simple Network Management Protocol). In this case, the malfunction receiving unit 511 can identify a malfunctioning device owing to an OID (Object Identifier) included in an SNMP message, etc. Incidentally, the malfunction notice indicated here is exemplary only and does not limit the invention. Another method for reporting on which the monitoring server 500 agrees with the respective switches in advance, e.g., can be used as well.

The data obtaining unit 512 obtains working data and device data of the malfunctioning device and another device being free from a malfunction. Upon being notified of a detected malfunction by the malfunction receiving unit 511, e.g., the data obtaining unit 512 transmits instructions to issue a supportsave command from the LAN port 503 to the respective swatches. Then, the data obtaining unit 512 receives supportsave data that the switches each obtain owing to the supportsave command from the LAN port 503, files the supportsave data in the cache memory 504 and notifies the malfunction cause identification unit 513 that the data is obtained.

The supportsave data obtained here by the data obtaining unit 512 includes working circumstances data which includes working data such that the devices each works, constitutions of the devices and so forth, notices of errors which have occurred on the respective devices, etc. The supportsave data includes, e.g., "licenseshow" for indicating license data, "chassisshow" for indicating a serial number and a type, and "version" for indicating an FOS version (version number). The supportsave data further includes "switchshow" for indicating a WWN (World Wide Name), "portshow" for indicating an effective port and "errdump" for indicating an error log.

The malfunction cause identification unit 513 identifies a cause of a malfunction on the basis of the supportsave data including the working data and device data obtained by the data obtaining unit 512. Specifically, the malfunction cause identification unit 513 identifies circumstances in which an error has occurred from "licenseshow", "chassisshow", "version", "switchshow" and "portshow" which are obtained by the data obtaining unit 512. Further, the malfunction cause identification unit 513 identifies a device on which an error has occurred from "errdump".

An example illustrated in FIG. 5 will be specifically explained. FIG. 5 illustrates a process for identifying a malfunction. Suppose, here, that the data obtaining unit 512 receives "supportsave-1" which is supportsave data from the switch 100. Suppose, similarly, that the data obtaining unit 512 receives "supportsave-2", "supportsave-3" and "supportsave-4" from the switches 200, 300 and 400, respectively.

In this case, the malfunction cause identification unit 513 extracts "licenseshow", "chassisshow", "version", "switchshow" and "portshow" from each of "supportsave-1" through "supportsave-4". Then, the malfunction cause identification unit 513 extracts license data of each of the switches from "licenseshow". Further, the malfunction cause identification unit 513 extracts data of a serial number, a type, etc. from "chassisshow". The malfunction cause identification unit 513 similarly extracts an object type which indicates a fan, a switch, a power supply unit, etc., an amount of power consumed by each of objects, how many days have passed since being powered on, etc. from "chassisshow".

Further, the malfunction cause identification unit 513 extracts a version of a switch kernel OS, an FOS version, a date of firmware implementation, data stored in a flash ROM in a switch, a firmware version and so forth from "version".

Further, the malfunction cause identification unit 513 extracts switch data and port status data from "switchshow". The malfunction cause identification unit 513 extracts, e.g., a state of a switch either online or offline, a role of the switch either subordinate or principal, a domain of the switch, a WWN of the switch, a beacon state of the switch and so forth as the switch data. Further, the malfunction cause identification unit 513 extracts a port (slot) number, a media type, a data rate of each of ports and so forth as the port status data. The malfunction cause identification unit 513 similarly extracts a port state for indicating facts of receiving an optical signal, of being asynchronous, etc., comment data specified by an administrator whether a path is an upward one directed towards the switch or a downward one directed apart from the switch, and so forth.

Further, the malfunction cause identification unit 513 extracts a name of a port, an SNMP state of a port for indicating being in diagnosis, etc., a physical state of a port for indicating that an optical signal is being received, etc., a history of state changes of a port, a port WWN of a connected device and so forth from "portshow". Further, the malfunction cause identification unit 513 extracts data for identifying a switch or a storage device on which an error has occurred and data related to an error such as when the error occurred, how important the error is, etc., from "errdump".

Further, the malfunction cause identification unit 513 obtains zoning data set to the switches, connection data for indicating a relation of being connected to another device and so forth from the respective switches. The malfunction cause identification unit 513, e.g., transmits instructions to issue a supportsave command to the respective switches so as to obtain a zoning configuration such as port zoning or WWN zoning. The malfunction cause identification unit 513 similarly obtains data indicating that the storage device 10 is connected to an active port A, etc. or partitioning data set between ports in a switch and so forth. Further, the malfunction cause identification unit 513 obtains version data of firmware and software of a storage device connected to a switch.

The malfunction cause identification unit 513 makes the respective switches run the supportsave command and analyzes obtained data as described above. As a result, the malfunction cause identification unit 513 obtains an error occurrence switch and a storage device, an error occurrence port, error occurrence time, switch connection data, zoning data, a switch FOS and a hardware constitution, and software and hardware constitutions of a storage device. Then, the malfunction cause identification unit 513 files data obtained through analysis in the analysis data DB 505.

The malfunction cause identification unit 513 analyzes the data obtained owing to the supportsave command in this way, so as to obtain data of a detailed malfunction, the malfunctioning device, connection circumstances between a switch and a storage device, switches connected in cascade connection and so forth.

Go back to FIG. 2. The software update unit 514 obtains software from the quality assurance server 800. If a malfunction identified by the malfunction cause identification unit 513 can be solved by an update of the software, the software update unit 514 then searches for an update of the software registered in the quality assurance server 800 after the identified malfunction is solved. If such an update is registered in the quality assurance server 800, the software update unit 514 instructs the malfunctioning device to update the software.

The software update unit 514, e.g., searches entries in the data item "detailed malfunction" in the precedent DB 506 by using entries in the data item "detailed malfunction" in the analysis data DB 505 as search keys, so as to identify records of the same detailed malfunction in both of the DBs. Then, the software update unit 514 checks for the both identified records whether an entry in "re switch" or "re storage" in the analysis data DB 505 agrees with an entry in "malfunction circumstances" in the precedent DB 506. Further, the software update unit 514 checks for the both identified records whether an entry in "re cascade connection" in the analysis data DB 505 agrees with an entry in "connection circumstances" in the precedent DB 506. If the above checks each turn out to be positive, run a process written in "detailed measures" in the precedent DB 506.

Examples illustrated in FIGS. 3 and 4 will be explained. Suppose, here, that the software update unit 514 has already identified records of "detailed malfunction" agreeing with each other. The software update unit 514 refers to the analysis data DB 505 so as to identify that the FOS version of the switch 100 connected to the storage device 50 on which a read error has occurred is "FOS-A". The software update unit 514 similarly identifies that the FOS version of the switch 200 connected to the switch 100 in cascade connection is "FOS-A2".

Then, the software update unit 514 refers to the precedent DB 506 so as to identify that a "read error" occurred in circumstances where the switch of "FOS-A" is connected with the switch of "FOS-A2".

That is, the software update unit 514 estimates the difference in the FOS versions of the switches connected with each other in cascade connection to have caused the error. Thus, the software update unit 514 obtains a latest version of the FOS from the quality assurance server 800, and transmits the obtained latest version to the switch 100. The switch 100 thereby updates the FOS version.

Constitution of Switch

Figure 6:
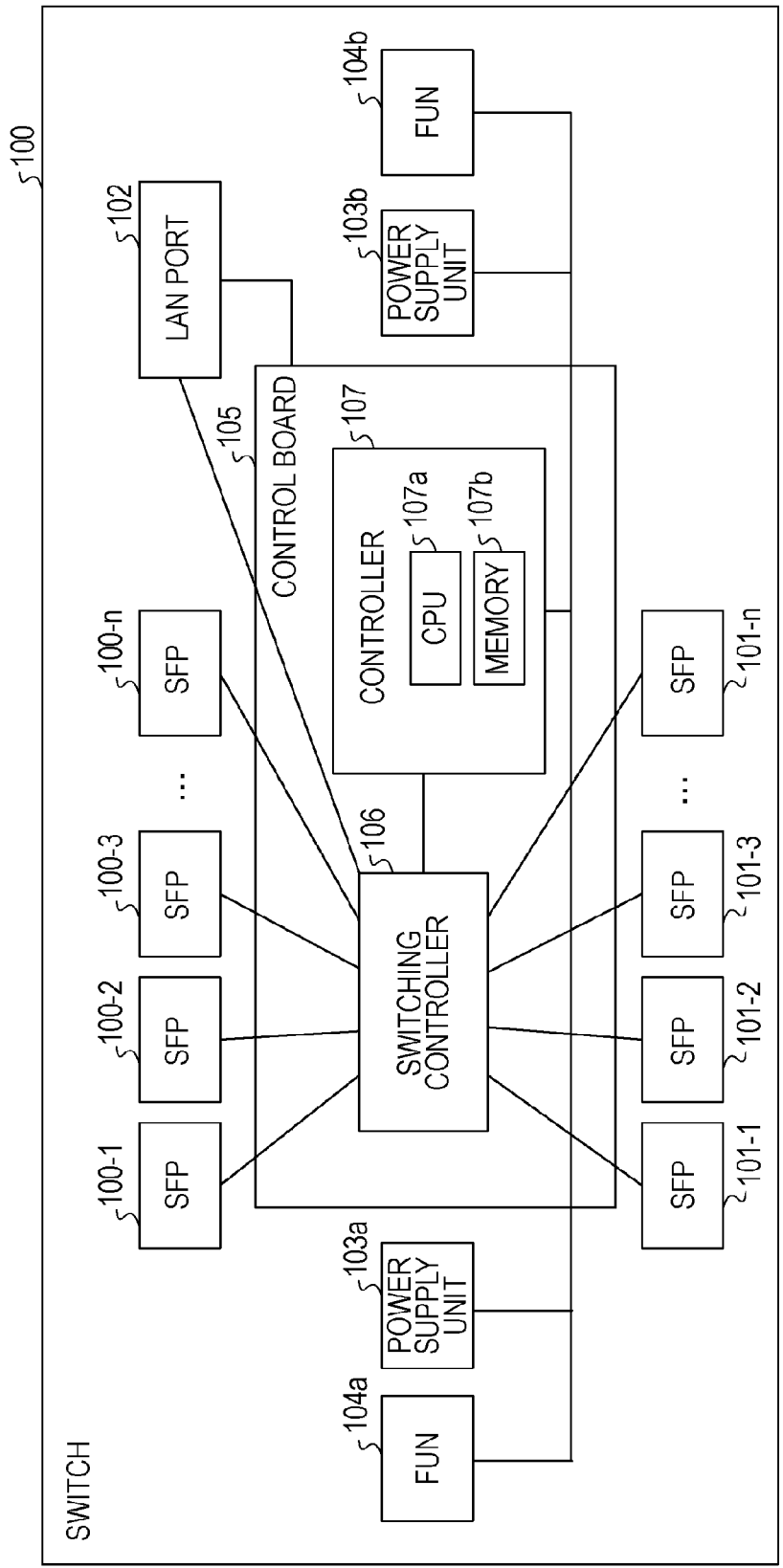
FIG. 6 is a block diagram illustrating a constitution of a switch.

FIG. 6 is a block diagram for illustrating a constitution of the switch. As the respective switches illustrated in FIG. 1 have the same constitutions, the switch 100 will be explained here as an example. The switch 100 has SFP (Small Form Factor Pluggable) units 100-1 to 100-$n$, SFP units 101-1 to 101-$n$ and a LAN port 102 as illustrated in FIG. 6. Further, the switch 100 has power supply units 103$a$ and 103$b$, fans 104$a$ and 104$b$ and a control board 105. Incidentally, the electronic parts and their numbers mentioned here are exemplary only, and do not limit the invention.

The SFPs 100-1 to 100-$n$ and 101-1 to 101-$n$ are each an interface to be connected with the business use network, and a connector to be plugged in and unplugged from another device through the FC. In FIG. 1, e.g., the switch 100 is connected to the switch 200 in cascade connection and to each of the storage devices 10 and 50 through the FC by the use of the SFPs 100-1 to 100-$n$ or 101-1 to 101-$n$. Thus, the switch 100 transmits a read request or a write request to each of the storage devices 10 and 50 and obtains an error notice via the SFPs.

The LAN port 102 is an interface to be connected with the maintenance use network, and is connected to the switching hub 5. The LAN port 102 transmits, e.g., an error having occurred on the storage device 10 or 50 or the switch 100 to the monitoring server 500. Further, the LAN port 102 receives maintenance instructions such as an updated version of the FOS from the monitoring server 500.

The power supply units 103$a$ and 103$b$ are power supply units of the switch 100 and are redundantly configured in preparation for a malfunction or a power failure. The fans 104$a$ and 104$b$ are each a blower which inhales air from the outside of the switch 100 and cools the electronic parts mounted on the switch 100 described above.

The control board 105 is an integrated circuit such as an ASIC (Application Specific Integrated Circuit), and has a switching controller 106 and a controller 107. The switching controller 106 has an internal memory in which switching paths among the respective SFPs, zoning data, partitioning data and so forth are stored. The switching controller 106 transmits received data via an SFP that a destination is connected to.

The controller 107 has a CPU 107$a$ which runs the monitoring software and SNMP control as well as the FOS, and a memory 107$b$ in which supportsave data and various kinds of logs are stored. The controller 107 supervises various kinds of processes in the switch 100.

The CPU 107$a$ runs the monitoring software so as to detect malfunctions occurring on the switch 100 and the storage devices 10 and 50 which are connected to the switch 100. Then, the CPU 107$a$ generates a malfunction report which reports a detected malfunction, and transmits the malfunction report to the switch 100 via the LAN port 102. The CPU 107$a$ can collect log data such as a result of a process run by the storage device and an error notice having occurred on the storage device and can file the log data in the memory 107$b$ by the use of the monitoring software and so forth in this way.

Further, upon receiving instructions to issue a supportsave command from the maintenance server 500 via the LAN port 102, the CPU 107$a$ issues a supportsave command to itself. Then, the CPU 107$a$ obtains supportsave data having "licenseshow", "chassisshow", "version", "switchshow", "portshow" and "errdump" from the memory 107$b$. Then, the CPU 107$a$ transmits the obtained supportsave data and storage device data to the monitoring server 500.

Further, upon receiving a new version of the FOS from the switch 100, the CPU 107$a$ installs the FOS, i.e., to update the FOS version. Upon receiving a new version of the monitoring software or a patch similarly from the switch 100, the CPU 107$a$ installs the monitoring software or applies the patch to the monitoring software.

Further, upon receiving a new version of software run on the storage devices 10 and 50 from the switch 100, the CPU 107$a$ transmits the software to the switching controller 106. Then, the switching controller 106 transmits the software to a storage device being a destination.

Constitution of Storage Device

Figure 7:
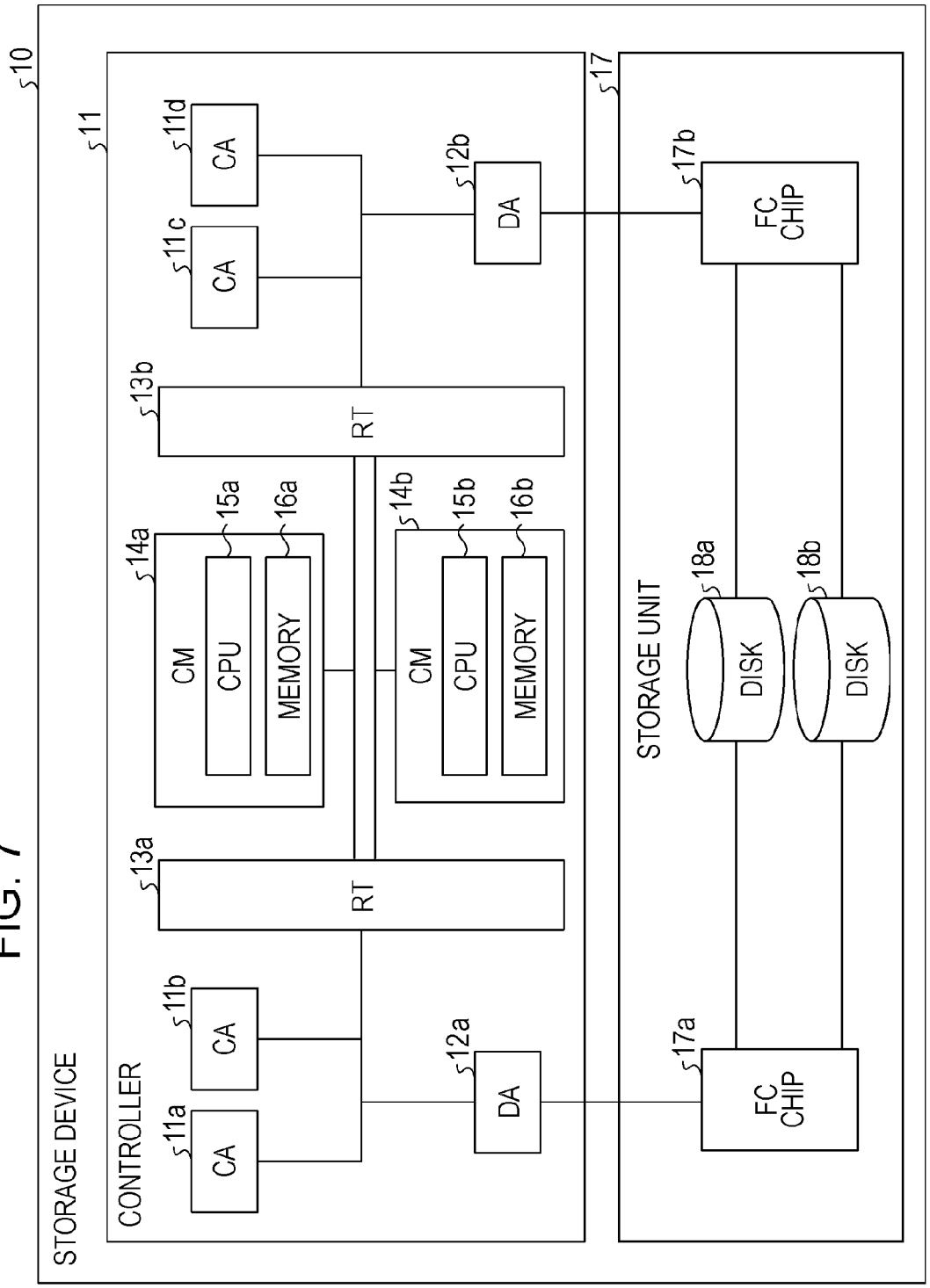
FIG. 7 is a block diagram illustrating a storage device.

FIG. 7 is a block diagram for illustrating the storage device. Incidentally, as the respective storage devices illustrated in FIG. 1 have the same constitutions, the storage device 10 will be explained here as an example. The storage device 10 has a controller 11 which reads and writes data and detects a failure and a storage unit 17 having a hard disk, etc. in which data is stored as illustrated in FIG. 7.

The controller 11 has CA units 11$a$-11$d$, DA (Device Adapter) units 12$a$ and 12$b$, RT (Router) units 13$a$ and 13$b$ and CM (Centralized Module) units 14$a$ and 14$b$.

The CAs 11$a$-11$d$ are redundantly configured adapters for host connection to be connected with the business use network. As illustrated in FIG. 1, e.g., the CAs 11$a$-11$d$ are each connected to one of the storage devices 10 and 50. The CAs 11$a$-11$d$ receive a request for reading data (read request) or a request for writing data (write request) from the server 600 or 700. Further, the CAs 11$a$-11$d$ transmit a result of a process in response to various kinds of requests to the server having requested the process. Further, the CAs 11$a$-11$d$ transmit various kinds of error reports which are notices of errors detected by the CMs 14$a$ and 14$b$ such as a read error, a write error, a communication error and so forth to the switch 100.

The DAs 12$a$ and 12$b$ are redundantly configured interfaces and adapters for drive connection to be connected to the storage unit 17. The DAs 12$a$ and 12$b$ transmit a read request and a write request received by the CAs 11$a$-11$d$ to the storage device 10 or 50. Further, the DAs 12$a$ and 12$b$ receive a result of a request having been transmitted to and achieved by the storage device 10 or 50.

The RTs 13$a$ and 13$b$ determine a connection path between each of the CAs and each of the DAs so as to achieve switching control. If the CA 11$a$ receives a read request, e.g., the RTs 13$a$ and 13$b$ output the request to the respective CMs. Further, if the DA 12$a$ receives a processed result, the RT 13$a$ identifies a server to be a destination from the processed result. Then, the RT 13$a$ identifies a CA that the identified server is connected to from path data stored in the CM 14$a$ or 14$b$. Then, the RT 13$a$ transmits the processed result received by the DA 12$a$ to the server via the identified CA.

The CMs 14$a$ and 14$b$ are redundantly configured modules, and controller modules which control the entire storage device 10. As the CMs 14$a$ and 14$b$ have the same constitutions, the CM 14$a$ will be explained here. The CM 14$a$ has a CPU 15$a$ which runs firmware for controlling the storage device 10 and monitoring software for monitoring the storage device 10.

The CPU 15$a$ detects various errors which occur on the storage device 10 such as a read error, a write error, a communication error and so forth by means of the monitoring software, files the detected errors as a log in a memory 16$a$, and transmits the detected errors to the switch 100. Further, the CPU 15a files various kinds of results achieved by the storage device 10 as a log in the memory 16a. Further, upon receiving a latest version of firmware or software form the switch 100, the CPU 15a updates its version.

Further, upon receiving a read request, etc. from one of the CAs, the CPU 15a identifies a requested destination, etc., from the read request, and runs a read process addressed to the identified destination. Then, the CPU 15a replies a result achieved and obtained through the read process to the server having requested to read. Upon receiving a write request from one of the CAs, the CPU 15a similarly identifies a requested destination, etc., from the write request, and runs a write process addressed to the identified destination. Then, the CPU 15a replies a result achieved and obtained through the write process to the server having requested to write.

The memory 16a stores therein a software program to be run by the CPU 15a and logs of results achieved by the CPU 15a, notices of errors detected by the CPU 15a, etc. Further, the memory 16a stores therein path data which relates each of the CAs to each of the DAs.

The storage unit 17 has FC chips 17a and 17b and disks 18a and 18b. The FC chips 17a and 17b are redundantly configured integrated circuits. The FC chip 17a is connected to the DA 12a, and controls communication between the DA 12a and the disk 18a and between the DA 12a and the disk 18b. The FC chip 17b is similarly connected to the DA 12b, and controls communication between the DA 12b and the disk 18a and between the DA 12b and the disk 18b. The disks 18a and 18b are storage units in which data to be processed by the respective servers are stored.

Flow of Process

Then, a flow of a process to be run by the monitoring server 500 will be explained by the use of FIGS. 8 and 9. A flow of a malfunction identifying process will be explained by the use of FIG. 8 here, and an automatic FOS updating process will be explained by the use of FIG. 9 as an example of detailed measures.

Malfunction Identifying Process

Figure 8:
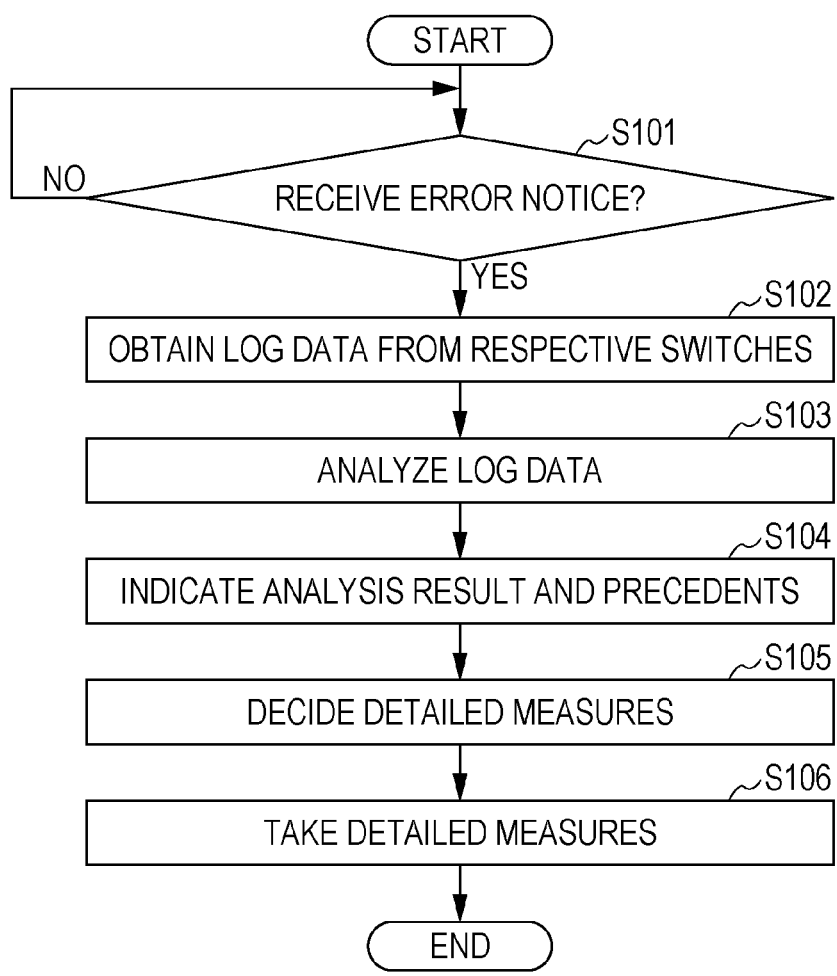
FIG. 8 is a flowchart indicating a flow of a malfunction identifying process.

FIG. 8 is a flowchart for indicating a flow of the malfunction identifying process. If the malfunction receiving unit 511 of the monitoring server 500 receives a malfunction report ("Yes" in S101), the data obtaining unit 512 obtains log data from the respective switches (S102) as illustrated in FIG. 8. The data obtaining unit 512 transmits, e.g., instructions to issue a supportsave command to the respective switches from the LAN port 503. Then, the data obtaining unit 512 receives supportsave data from the respective switches via the LAN port 503, and files the received supportsave data in the cache memory 504.

Then, the malfunction cause identification unit 513 analyzes the supportsave data stored in the cache memory 504, and files a result of the analysis in the analysis data DB 505 (S103). The malfunction cause identification unit 513 may indicate the result of the analysis, the precedents, etc. on a monitor display, or notify an administrator of those at this time (S104).

The malfunction cause identification unit 513 identifies a device on which an error has occurred and details of the error, e.g., from "errdump" of the supportsave data of the switch having reported the malfunction, etc. Further, the malfunction cause identification unit 513 obtains the FOS version of the switch from "version" of the supportsave data of the switch having reported the malfunction, etc. Further, the mal-function cause identification unit 513 obtains data regarding connection circumstances with other devices, a software version of the storage device that the switch is connected to and so forth from the switch. And the malfunction cause identification unit 513 files the obtained data in the analysis data DB 505.

Then, the software update unit 514 compares the result of the analysis stored in the analysis data DB 505 with the precedents stored in the precedent DB 506 so as to decide detailed measures (S105), and take the detailed measures having been identified (S106).

The software update unit 514 checks, e.g., whether "detailed malfunction" combined with "re switch" or "detailed malfunction" combined with "re storage" stored in the analysis data DB 505 is stored in "detailed malfunction" and "malfunction circumstances" in the precedent DB 506. If they are stored in the precedent DB 506, the software update unit 514 runs a same process as "detailed measures" corresponding to "detailed malfunction" and "malfunction circumstances" having been identified. Meanwhile, the software update unit 514 may transmit a message including "detailed malfunction", "re switch", "re storage" and so forth to the CE.

Automatic FOS Updating Process

Figure 9:
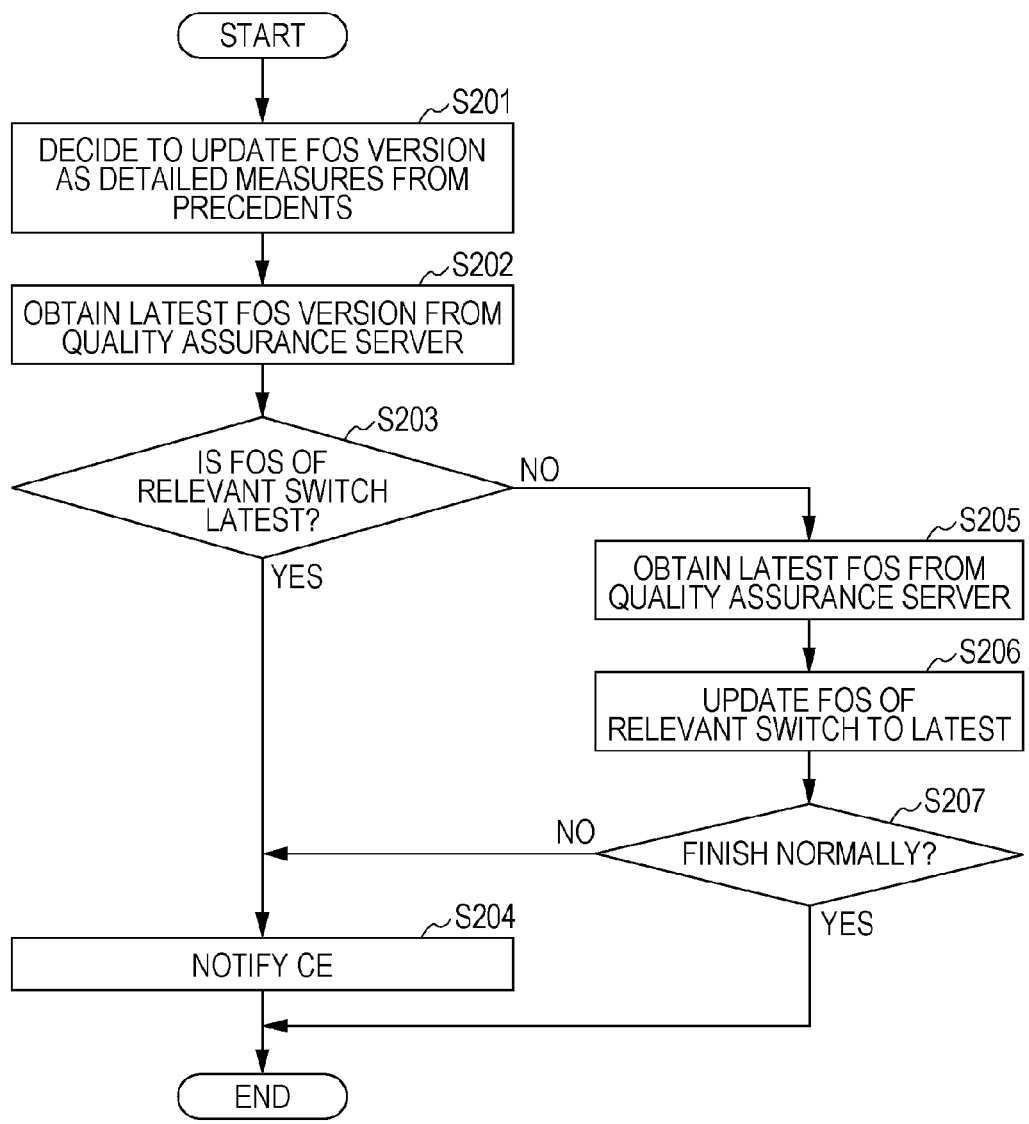
FIG. 9 is a flowchart illustrating a flow of an automatic FOS updating process.

FIG. 9 is a flowchart for illustrating a flow of the automatic FOS updating process. Upon deciding to update the FOS version as the detailed measures from the precedents stored in the precedent DB 506 (S201), the software update unit 514 obtains a latest FOS version from the quality assurance server 800 as illustrated in FIG. 9 (S202).

Next, the software update unit 514 checks whether the FOS version of the switch to be updated is latest (S203). The software update unit 514, e.g., compares the FOS version included in the result of the analysis stored in the analysis data DB 505 with the latest FOS version obtained from the quality assurance server 800 so as to check whether the FOS of the target switch is the latest one.

If the FOS version of the switch is the latest one ("Yes" of S203), the software update unit 514 notifies the CE of an error without updating the FOS version (S204). As a result, the CE changes parts, the switch itself, etc.

Meanwhile, unless the FOS version of the switch is the latest one ("No" of S203), the software update unit 514 obtains the latest FOS version from the quality assurance server 800 (S205). The software update unit 514 decides that the system will recover from the failure by updating the FOS version in this way on the grounds that the FOS version was updated so as to take measures to a failure which is a same as the one occurring at present as recorded in the precedents, or that the CE has not changed the detailed measures taken to the same failure in the past, in other words.

Then, the software update unit 514 applies the latest FOS version to the switch (S206). That is, the software update unit 514 updates the FOS version of the switch.

If the FOS version is normally updated to the end after that ("Yes" in S207), the software update unit 514 ends the process. Meanwhile, unless the FOS version is normally updated to the end ("No" in S207), the software update unit 514 notifies the CE of an error (S204).

Effects of First Embodiment

According to the first embodiment, the monitoring server 500 can automatically obtain data of constitutions in connection and errors collected by the respective devices so as to quickly grasp where in the entire system a failure has occurred, so as to quickly clear up the cause of the failure. Further, as the cascade connection circumstances of the switches, the FOS versions of the respective switches, error-related conditions of the storage devices and so forth can be collected, the monitoring server 500 can provide the CE with useful system data even if being unable to automatically decide the detailed measures. As a result, the monitoring server 500 can quickly clear up a cause of a failure even if an unknown or unsolved error is detected.

Second Embodiment

Figure 10:
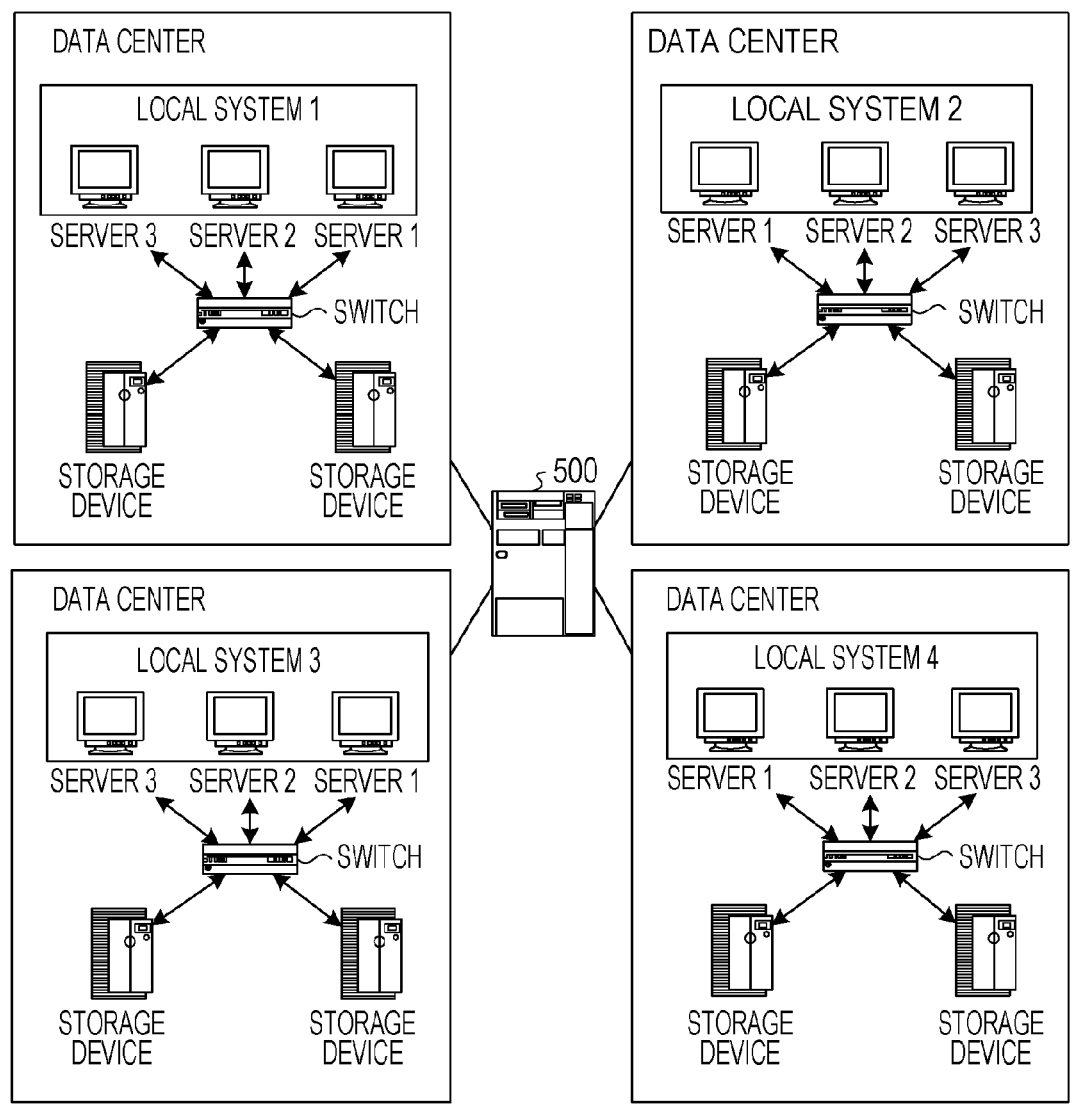
FIG. 10 illustrates an exemplary system in which a plurality of data centers is collectively supervised.

Then, an exemplary case where a plurality of data centers is collectively managed. FIG. 10 illustrates an exemplary system in which a plurality of data centers is collectively managed. The system has a monitoring server 500 and a plurality of data centers, and the monitoring server 500 is connected to the individual data centers through a maintenance use network not to be used for business, as illustrated in FIG. 10. The monitoring server 500 has same functions as those of the monitoring server explained with reference to FIG. 2.

The data centers each have a plurality of servers, a plurality of storage devices and at least one switch. The switch has same functions as those of the switch explained with reference to FIG. 6, and is connected to the monitoring server 500. The servers each have functions as those of the server explained with reference to FIG. 1, and carries out respective tasks. The storage devices each have functions as those of the storage device explained with reference to FIG. 7. Further, network circumstances of the data centers are formed by a business use network and a maintenance use network similarly as in FIG. 1.

If an error occurs on one of the data centers in such circumstances, the data obtaining unit 512 of the monitoring server 500 transmits instructions to issue a supportsave command to the switch of each of the data centers, so as to collect supportsave data from the respective switches. The monitoring server 500 may receive an error report from a switch or a router for each of the data centers to communicate with the outside, e.g., according to an SNMP, or may periodically ask the switch and obtain an error notice, by using any known method. The monitoring server 500 collects constitution data of a data center on which an error has occurred and a data center being free from an error in this way.

Then, the malfunction cause identification unit 513 of the monitoring server 500 obtains and combines various data from the supportsave data described above, so as to add up the number of error occurrences of every FOS, connection relations among the switches in time of error occurrences and so forth. The malfunction cause identification unit 513, e.g., adds up devices on which errors occurred, software versions of the devices on which errors occurred and so forth. As a result, the malfunction cause identification unit 513 identifies that errors are frequently detected on switches having "FOS-A" as the FOS version, that errors are frequently detected in circumstances where switches of different FOS versions are connected in cascade connection and so forth.

If errors having occurred on switches having "FOS-A" as the FOS version are above a threshold after that, the software update unit 514 updates the FOS version of each of the switches running "FOS-A". Further, if errors having occurred in circumstances where switches of different FOS versions are connected in cascade connection are above a threshold, the software update unit 514 updates the FOS versions so that the FOS versions of both of the switches are equal to each other.

The monitoring server 500 can add up error occurrences biased owing to system constitutions such as combination of devices and the FOS in this way. If the error occurrences are biased, the monitoring server 500 updates the FOS in order to make the system constitutions alike, so as to prevent failure occurrences. The respective devices can thereby stably work.

Next, a process for searching for a switch working in similar condition in time of an error occurrence will be explained. FIG. 11 is a flowchart for illustrating a process for searching for a switch working in similar condition in time of an error occurrence.

The data obtaining unit 512 of the monitoring server 500 having detected an error starts to add up errors (S301). Then, the data obtaining unit 512 transmits instructions to issue a supportsave command to the switch having reported the error, i.e., the switch on which the error has occurred, so as to obtain supportsave data stored in the switch (S302). Then, the malfunction cause identification unit 513 analyzes the supportsave data of the malfunctioning switch and extracts various kinds of data, so as to identify constitution condition of the switch on which the error has occurred and so forth (S303). The malfunction cause identification unit 513 identifies, e.g., the FOS version of the switch, cascade condition, connection condition of the storage device, the number of error occurrences and so forth as the constitution condition of the switch.

Further, the data obtaining unit 512 transmits instructions to issue a supportsave command to each of switches except for the switch having reported the error, i.e., correctly working switches, so as to obtain supportsave data stored in the correctly working switches (S304). Then, the malfunction cause identification unit 513 analyzes the supportsave data of the correctly working switches and extracts various kinds of data, so as to identify constitution condition of the switches and so forth (S305).

Then, the malfunction cause identification unit 513 compares a result of analysis obtained at S304 for the switch including the error with a result of analysis obtained at S305 for the switches being free from an error (S306).

Then, the malfunction cause identification unit 513 adds up the number of occurrences of every error and the number of errors of every FOS (S307), and indicates the added up result as a graph or something on a display monitor, etc (S308). As a result, upon deciding that a switch on which no error has occurred similarly constituted as the switch on which the error has occurred is present ("Yes" in S309), the software update unit 514 notifies the CE who manages the switch of an error beforehand (S310). Incidentally, upon deciding that no switch similarly constituted as the switch on which the error has occurred is present ("No" in S309), the software update unit 514 ends the process.

The software update unit 514 updates the FOS version, e.g., of a switch on which a same failure as the detected one is not detected yet, the switch having the same FOS version as that of the switch on which the error has occurred.

The software update unit 514 of another example identifies a combination of the FOS of the switch on which the error has occurred with the FOS of a switch connected to the former switch in cascade connection. Then, the software update unit 514 identifies another switch connected in cascade connection with the same FOS combination as the identified one, and updates the FOS of the identified switch.

The monitoring server 500 adds up the combinations of the devices on which errors occurred with the FOS and quickly updates the FOS of combinations of high occurrence probability. The monitoring server 500 can thereby prevent a failure from occurring beforehand. In a case where a plurality of data centers is used to provide service such as cloud computing, the monitoring server 500 can have an error notice having occurred on each of the data centers in common. As a result, the monitoring server 500 can prevent a failure, quickly detect a failure and quickly recover the system from the failure, so that the entire system can work safely.

Third Embodiment

The embodiments of the present invention have been explained above. The present invention can be implemented in other various forms except for the above embodiments. Thus, another embodiment will be explained below.

Although the detailed measures exemplarily explained as to the first embodiment is to update the FOS version, the detailed measures are not limited to that. Conceivable detailed measures are to change hardware units, to re-install software or firmware and so forth. Failures to be detected include a circuit failure and so forth. If recovery errors are above a threshold, e.g., the monitoring server 500 decides the detailed measures to change hardware units, and notifies the CE of the decision by email or something. Further, upon deciding the detailed measures to re-install software or firmware, the monitoring server 500 obtains relevant software or something from the quality assurance server 800 and installs that into the relevant device.

Further, some or all of the processes explained as to the embodiments while being supposed to be automatically run can be manually run as well. Meanwhile, some or all of the processes explained while being supposed to be manually run can be automatically run by the use of a known method. Besides, processing procedures, control procedures and specific names indicated in the above document and drawings and information including various kinds of data and parameters indicated in FIGS. 3, 4, etc. can be changed in any way unless otherwise noted.

Further, the illustrated components of the respective devices are each functionally and conceptually drawn, and do not necessarily require being physically constituted as illustrated above. That is, e.g., specific forms of separation and integration of the respective devices are not limited to what is illustrated, such that the malfunction receiving unit 511 is integrated with the data obtaining unit 512. That is, some or part of the devices can be constituted by being functionally or physically separated or integrated by any unit in accordance with various kinds of load or condition of use. Further, some or part of the respective processing functions run on the respective devices can be implemented by a CPU or programs analyzed and run by the CPU, or implemented by hardware by means of a wired logic circuit.

Incidentally, the processes of the respective functional portions explained as to the embodiment can be implemented by a computer such as a personal computer or a workstation which runs a prepared program. The program can be distributed through a network such as the Internet. Further, the program can be recorded on a computer-readable recording medium such as a hard disk, a flexible disk (FD), a CD-ROM, an MO or a DVD, and can be read from the recording medium and run by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring system having a storage device in which data is stored, the monitoring system comprising:
   a switch configured to relay a plurality of various requests to the storage device; and
   a monitoring server device configured to monitor running circumstances of the switch or the storage device,
   the switch comprising:
     a transmitting unit configured to transmit, upon detecting a malfunction on an own device or the storage device, a malfunction notice including details of the detected malfunction to the monitoring server device,
   the monitoring server device comprising:
     a receiving unit configured to receive a malfunction notice of the switch or the storage device;
     a malfunction device identification unit configured to identify the switch or the storage device under malfunctioning based on the received malfunction notice;
     a data obtaining unit configured to transmit instructions to obtain running data and device data to the switch or the storage device known to be malfunctioning based on reception of the malfunction notice and a switch or a storage device known to be free from the malfunction based on lack of reception of the malfunction notice, to receive running data and device data of the switch or the storage device under malfunctioning, and to receive running data and device data of the switch or the storage device free from the malfunction; and
     a malfunction cause identification unit configured to identify a cause of the malfunction, based on the running data and the device data of the switch or the storage device that is malfunctioning and the switch or the storage device that is not malfunctioning by comparing the running data and the device data of the switch or the storage device that is malfunctioning to the running data and the device data of the switch or the storage device that is not malfunctioning, wherein
   the monitoring server device includes a software update unit that
     determines whether the switch free from malfunctioning has a structure similar to a structure of the switch known to be malfunctioning based on the running data and the device data obtained by the data obtaining unit, the structure of the switch including at least a type of the switch, a software version of the switch, a cascade condition of the switch, and a connection condition of the storage device, and
     notifies a customer engineer of a malfunction prediction of the switch free from malfunctioning when determining that the switch free from malfunctioning has a structure similar to the switch under malfunctioning.

* * * * *